United States Patent
Gumpoltsberger et al.

(10) Patent No.: US 8,197,376 B2
(45) Date of Patent: Jun. 12, 2012

(54) MULTI-RATIO TRANSMISSION

(75) Inventors: Gerhard Gumpoltsberger, Friedrichshafen (DE); Christian Sibla, Friedrichshafen (DE); Stefan Beck, Eriskirch (DE); Josef Haupt, Tettnang (DE); Gert Bauknecht, Friedrichshafen (DE); Peter Ziemer, Tettnang (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 13/384,628

(22) PCT Filed: Aug. 19, 2010

(86) PCT No.: PCT/EP2010/062127
§ 371 (c)(1),
(2), (4) Date: Jan. 18, 2012

(87) PCT Pub. No.: WO2011/020895
PCT Pub. Date: Feb. 24, 2011

(65) Prior Publication Data
US 2012/0115671 A1 May 10, 2012

(30) Foreign Application Priority Data
Aug. 20, 2009 (DE) .......... 10 2009 028 681

(51) Int. Cl.
*F16H 3/44* (2006.01)
(52) U.S. Cl. .......... 475/280; 475/269; 475/330
(58) Field of Classification Search .......... 475/269, 475/271, 280, 282, 284, 296, 329, 330
See application file for complete search history.

(56) References Cited

U.S. PATENT DOCUMENTS

| 4,683,776 A | 8/1987 | Klemen |
| 6,558,287 B2 | 5/2003 | Hayabuchi et al. |

(Continued)

FOREIGN PATENT DOCUMENTS

DE   26 36 969 A1   2/1978

(Continued)

OTHER PUBLICATIONS

Gumpultsberger, Gerhard: Systematic Synthesis and Evaluation of Multi-Stage Planetary Transmissions, Dissertation TU Chemnitz, 2007, pp. 1-210.

(Continued)

*Primary Examiner* — Justin Holmes
(74) *Attorney, Agent, or Firm* — Davis & Bujold, P.L.L.C.

(57) ABSTRACT

A multi-stage transmission with nine forward gears and one reverse gear comprising four planetary gear sets, eight rotatable shafts and six shift elements. The sun gear of the first set is connected to fourth shaft which is couplable to a housing by the first brake, the carrier of the first set is connected to the third shaft, which is coupled to the housing by the second brake, which is detachably connectable to the drive shaft, via the first clutch, and via a second clutch is detachably connectable to the seventh shaft. The seventh shaft is connected to the ring gear of the second set and with the sun of the fourth set, and the drive shaft is connected to the sun of the second set and to the carrier of the third set. The sixth shaft is connected to the ring gear of the first set, the carrier of the second set and the sun gear of the third set. The ring gear of the fourth set is connected to the fifth shaft which can be coupled to the housing via the third brake. The output shaft, via a third clutch, is detachably connectable to the eighth shaft, which is connected to the ring gear of the second set and to the carrier of the fourth set.

3 Claims, 1 Drawing Sheet

U.S. PATENT DOCUMENTS

| | | |
|---|---|---|
| 6,634,980 B1 | 10/2003 | Ziemer |
| 6,960,149 B2 | 11/2005 | Ziemer |
| 7,549,942 B2 | 6/2009 | Gumpoltsberger |
| 7,699,743 B2 | 4/2010 | Diosi et al. |
| 2008/0261756 A1 | 10/2008 | Carey et al. |
| 2009/0048059 A1 | 2/2009 | Phillips et al. |

FOREIGN PATENT DOCUMENTS

| | | |
|---|---|---|
| DE | 199 49 507 A1 | 4/2001 |
| DE | 101 15 995 A1 | 10/2002 |
| DE | 102 13 820 A1 | 10/2002 |
| DE | 10 2005 010 210 A1 | 9/2006 |
| DE | 10 2006 006 637 A1 | 9/2007 |
| DE | 10 2008 016 084 A1 | 10/2008 |
| DE | 10 2008 000 428 A1 | 9/2009 |
| JP | 2005 036955 A | 2/2005 |
| JP | 2006-349153 A | 12/2006 |
| WO | 2009/106408 A1 | 9/2009 |

OTHER PUBLICATIONS

Gumpultsberger, Gerhard: Synthesis of Planetary Transmissions, ZF Friedrichshafen AG, 2009, 13 pages.

| | 03 | 04 | 05 | 13 | 28 | 37 | i | phi |
|---|---|---|---|---|---|---|---|---|
| 1. GEAR | | X | X | | | X | 5.945 | 1.807 |
| 2. GEAR | | | X | X | | X | 3.291 | 1.504 |
| 3. GEAR | | | X | X | X | | 2.188 | 1.412 |
| 4. GEAR | | | X | | X | X | 1.550 | 1.303 |
| 5. GEAR | | X | | | X | X | 1.189 | 1.189 |
| 6. GEAR | | | | X | X | X | 1.000 | 1.141 |
| 7. GEAR | | X | | X | | X | 0.876 | 1.153 |
| 8. GEAR | X | | | | X | X | 0.760 | 1.150 |
| 9. GEAR | X | X | | | X | | 0.661 | 8.997 |
| R GEAR | X | X | X | | | | -5.266 | -0.886 |

# MULTI-RATIO TRANSMISSION

This application is a National Stage completion of PCT/EP2010/062127 filed Aug. 19, 2010, which claims priority from German patent application no. 10 2009 028 681.0 filed Aug. 20, 2009.

FIELD OF THE INVENTION

The present invention relates to a multi-step transmission of a planetary design, in particular an automatic transmission for a motor vehicle.

BACKGROUND OF THE INVENTION

According to the prior art, automatic transmissions, particularly for motor vehicles, comprise planetary gear sets that are shifted using friction elements or shift elements such as clutches and brakes, and typically are connected to a start-up element, such as a hydrodynamic torque converter or a fluid coupling, that is subject to a slip effect and is optionally provided with a lock-up clutch.

Such an automatic transmission is known, for example, from the applicant's patent DE 199 49 507 A1, according to which two non-shiftable front-mounted gear sets are provided on the drive shaft and generate two rotational speeds on the output side, which, in addition to the rotational speed of the drive shaft, can be selectively meshed with a shiftable double planetary gear set acting on the output shaft, by selective engagement of the shift elements such that only one of the two currently actuated shift elements must be engaged or disengaged to shift from one gear to the next higher or lower gear.

By using five shift elements, seven forward gears are obtained; by using six shift elements, nine or ten forward gears are obtained.

Furthermore, a multi-step automatic transmission with eight forward gears and one reverse gear is known from DE 102 13 820 A1, and it comprises a first input path T1 of the first transmission ratio; an input path T2, which features a larger transmission ratio than this input path T1; a planetary gear set of the Ravigneaux type with four elements, wherein the four elements are placed as a succession of elements in a rotational speed diagram as a first element, a second element, a third element and a fourth element; a clutch C-2, which transfers the torque of input path T2 onto the first element S3, a clutch C-1, which transfers the torque of input path T2 onto the fourth element S2; a clutch C-4, which transfers the torque of input path T1 onto the first element; a clutch C-3, which transfers the torque of input path T1 onto the second element C3; a brake B-1, which produces the mesh of the fourth element; a brake B-2, which produces the mesh of the second element; and a drive element, which is coupled with the third element S3.

Furthermore, a nine-speed multi-step transmission is known from DE 29 36 969 A1; it comprises eight shift elements and four gear sets, wherein one gear set serves as a front-mounted gear set and the main gearing includes a Simpson set and a further gear set serving as reverse gearing.

Additional multi-step transmissions are, for example, known from the applicant's DE 102005010210 A1 and DE 102006006637 A1.

Automatically shiftable vehicle transmissions of the planetary design, are already generally described numerous times in the prior art and are continually undergoing further development and improvement. These transmissions should have a relatively simple design, in particular requiring a low number of shift elements, and avoid the need for double shifting when sequential shifting is performed, thereby ensuring that only one shift element is ever switched when shifting is performed in defined groups of gears.

The applicant's document DE 102008000428.3, which is not yet published, discloses a multi-step transmission of a planetary design that features an input shaft and an output shaft which are arranged in a housing. The known transmission includes at least four planetary gear sets which are designated, in the following, as the first, second, third, and fourth planetary gear set, at least eight rotatable shafts which are designated in the following as the drive shaft, output shaft, third, fourth, fifth, sixth, seventh, and eighth shaft, and at least six shift elements comprising brakes and clutches, whose selected engagement produces different transmission ratios between the input shaft and the output shaft, and therefore preferably nine forward gears and one reverse gear are feasible.

The first and second planetary gear sets, which are preferably designed as minus planetary gear sets, form a shiftable front-mounted gear set, wherein the third and fourth planetary gear sets form a main gear set.

In the known multi-step transmission, the carriers of the first and second planetary gear sets are coupled together via the fourth shaft, which is connected to an element of the main gear set, the ring gear of the first planetary gear set is coupled to the sun gear of the second planetary gear set via the eighth shaft, which is detachably connectable to the drive shaft via the first clutch, and the sun gear of the first planetary gear set can be coupled to a transmission housing by means of the third shaft, via a first brake, and is detachably connectable to the drive shaft via a second clutch, wherein the ring gear of the second planetary gear set can be coupled to a transmission housing by means of the fifth shaft, via a second brake. In addition, the seventh shaft is constantly connected to at least one element of the main gear set, and can be coupled to a transmission housing via a third brake, wherein the sixth shaft is constantly connected to at least one further element of the main gear set and is detachably connectable to the drive shaft, via a third clutch; the output shaft is constantly connected at least to one further element of the main gear set.

In the known transmission, the fourth shaft is preferably constantly connected to the ring gear of the third planetary gear set, wherein the sixth shaft is constantly connected to the ring gear of the fourth planetary gear set and to the carrier of the third planetary gear set, and is detachably connectable to the drive shaft via the third clutch. Furthermore, the seventh shaft is constantly connected to the sun gears of the third and fourth planetary gear sets, and can be coupled to a transmission housing via the third brake. In this case, the output drive is produced via the output shaft that is constantly connected to the carrier of the fourth planetary gear set. Furthermore, the third and fourth planetary gear sets can be combined or reduced to a Ravigneaux set having a common carrier and a common ring gear.

SUMMARY OF THE INVENTION

The objective of the present invention is to propose a multi-step transmission of the initially described type, which features nine forward gears and at least one reverse gear, with a sufficient transmission ratio, in which the construction expenditure and the overall size, in particular the overall length and weight, are optimized, and additionally, in which efficiency is improved with respect to drag losses and gearing losses. In addition, in the multi-step transmission according to the invention, minimal support moments should be exerted on the shift elements. According to the invention, the transmission should be particularly suited for a front transverse construction.

Accordingly, a multi-step transmission, according to the invention, of a planetary design is proposed, which has an input shaft and an output shaft which are arranged in a housing. In addition, there are provided at least four planetary gear sets which are designated, in the following, as the first, second, third, and fourth planetary gear set, eight rotatable shafts which are designated, in the following, as the drive shaft, output shaft, third, fourth, fifth, sixth, seventh, and eighth shaft, and at least six shift elements comprising brakes and clutches, whose selective engagement produces different transmission ratios between the drive shaft and the output shaft, and thus preferably nine forward gears and one reverse gear are feasible.

The planetary gear sets, viewed axially, are arranged in the sequence of first planetary gear set, second planetary gear set, third planetary gear set, fourth planetary gear set, and are preferably designed as minus planetary gear sets.

As is well known, a simple minus planetary gear set comprises a sun gear, a ring gear, and a carrier on which the planetary gears are rotatably supported, the planetary gears meshing with the sun gear and the ring gear, respectively. As a result, when the carrier is held in place, the ring gear has a rotational direction that is opposite to that of the sun gear. In contrast, a simple plus planetary gear set comprises a sun gear, a ring gear and a carrier, on which inner and outer planet gears are rotatably supported, wherein all inner planet gears mesh with the sun gear and all outer planet gears mesh with the ring gear, wherein each inner planet gear meshes with only one outer planet gear. As a result, when the carrier is held in place, the ring gear has the same rotational direction as the sun gear.

According to the preferable embodiment of the invention, the sun gear of the first planetary gear set is connected to the fourth shaft, which can be coupled to the transmission housing via the first brake, wherein the carrier of the first planetary gear set is connected to the third shaft, which can be coupled to the transmission housing via the second brake, is detachably connectable via the first clutch to the drive shaft and via the second clutch with the seventh shaft, wherein the seventh shaft is connected to the ring gear of the second planetary gear set and the sun gear of the fourth planetary gear set, and the drive shaft is connected to the sun gear of the second planetary gear set and to the carrier of the third planetary gear set.

In addition, the ring gear of the first planetary gear set is connected to the sixth shaft, which is directly connected to the carrier of the second planetary gear set and the sun gear of the third planetary gear set, wherein the ring gear of the fourth planetary gear set can be coupled to a transmission housing, and wherein the output shaft, via a third clutch, is detachably connectable to the eighth shaft, which is connected to the ring gear of the third planetary gear set and to the carrier of the fourth planetary gear set.

The embodiment of the multi-step transmission, according to the invention, results in transmission ratios that are particularly suitable for passenger vehicles, and in a greater overall gear ratio of the multi-step transmission, thereby improving driving smoothness and significantly reducing fuel consumption.

Furthermore, construction expenditure is significantly reduced with the multi-step transmission, according to the invention, due to a small number of shift elements. According to the invention, the multi-step transmission offers the advantage of enabling to perform the start-up with a hydrodynamic converter, an external start-up clutch, or even with other suitable external start-up elements. It is also conceivable to perform the start-up using a start-up element integrated into the transmission. Preferably, a shift element that is actuated in the first forward gear and in the reverse gear is suitable.

Moreover, the multi-step transmission, according to the invention, results in good efficiency in the main drive gears with respect to drag losses and gearing losses.

Furthermore, low moments occur in the shift elements and in the planetary gear sets of the multi-step transmission, thereby advantageously reducing wear in the multi-step transmission. In addition, the low moments make it possible to utilize correspondingly low dimensions, thereby reducing the necessary installation space and related costs. Furthermore, the rotational speeds of the shafts, shift elements, and planetary gear sets are low.

In addition, the transmission, according to the invention, is designed to allow adaptability to different drive train embodiments in terms of power flow direction and spatial aspects.

BRIEF DESCRIPTION OF THE DRAWINGS

The invention is described in greater detail in the following examples, supported by the attached figures. They show.

DETAILED DESCRIPTION OF THE PREFERRED EMBODIMENTS

Figures 1, 2:
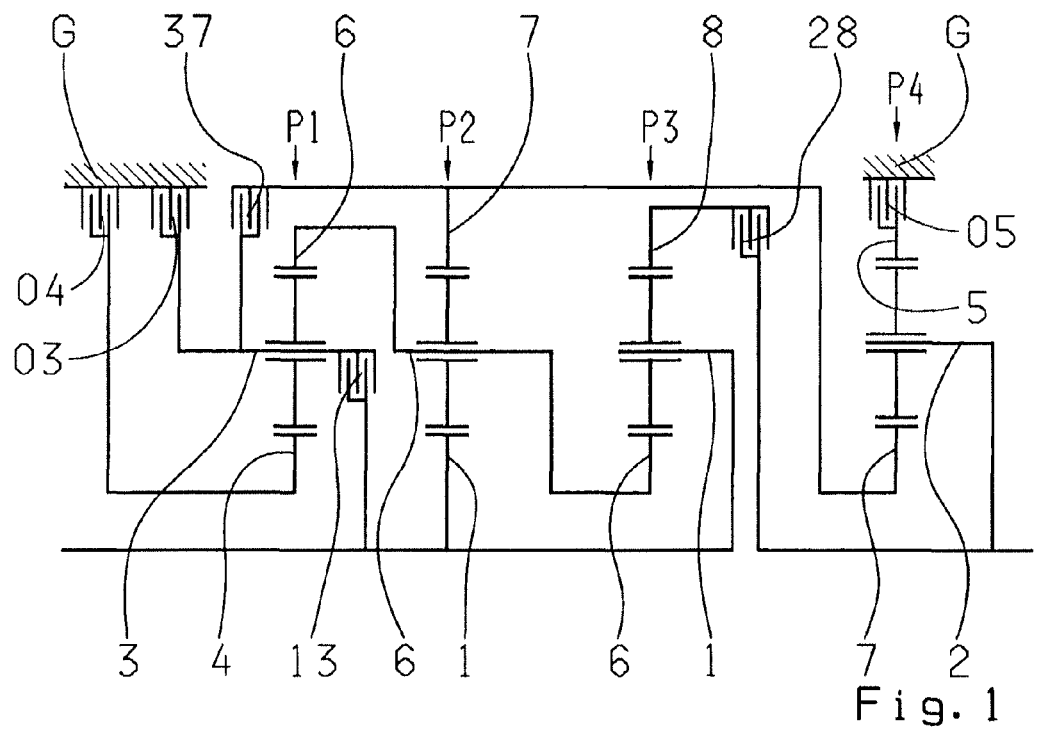
FIG. 1: a schematic view of a first preferred embodiment of a multi-step transmission according to the invention.
FIG. 2: an example of shift schematics for a multi-step transmission according to FIG. 1.

FIG. 1 shows a multi-step transmission, according to the invention, which has a drive shaft 1, an output shaft 2, and four planetary gear sets P1, P2, P3 and P4 which are arranged in a housing G. Planetary gear sets P1, P2, P3 and P4, in the example shown in FIG. 1, are designed as minus planetary gear sets. According to the invention, at least one planetary gear set can be implemented as a plus planetary gear set if the carrier and ring gear connection are exchanged and, simultaneously, the value of the stationary transmission ratio is increased by 1 in comparison to the embodiment as a minus planetary gear set.

In the embodiment shown, the planetary gear sets, viewed axially, are arranged in the sequence P1, P2, P3 and P4.

As depicted in FIG. 1, six shift elements are provided, namely, three brakes, 03, 04, 05 and three clutches 13, 37 and 28. The spatial disposition of the shift elements can be arbitrary, and is only limited by the dimensions and the outer design. The clutches and the brakes of the transmission are preferably implemented as friction shift elements or lamellar shift elements.

Selective shifting of nine forward gears and one reverse gear can be performed using these shift elements. The multi-step transmission, according to the invention, has a total of eight rotatable shafts, namely, the shafts 1, 2, 3, 4, 5, 6, 7 and 8, wherein the drive shaft is the first shaft, and the output shaft is the second shaft of the transmission.

The multi-step transmission, according to the invention, as shown in FIG. 1, provides that the sun gear of the first planetary gear set P1 is connected to the fourth shaft 4, which can be coupled to the transmission housing G via a first brake 04, wherein the carrier of the first planetary gear set P1 is connected to the third shaft 3, which can be coupled to the transmission housing G via a second brake 03, and is detachably connectable to the drive shaft via the first clutch 13 and to the seventh shaft 7 via a second clutch 37.

As depicted in FIG. 1, the seventh shaft 7 is connected to the ring gear of the second planetary gear set P2 and the sun gear of the fourth planetary gear set P4, wherein the drive shaft 1 is connected to the sun gear of the second planetary gear set P2 and to the carrier of the third planetary gear set P3.

According to the invention, the ring gear of the first planetary gear set P1 is connected to the sixth shaft 6, which is connected to the carrier of the second planetary gear set P2 and the sun gear of the third planetary gear set P3, wherein the ring gear of the fourth planetary gear set P4 is connected to the fifth shaft 5, which can be coupled to the transmission housing G via the third brake 05; the output shaft 2, via a third clutch 28, is detachably connectable to the eighth shaft 8, which is connected to the ring gear of the third planetary gear set P3 and to the carrier of the fourth planetary gear set P4.

According to the invention, the first clutch 13, viewed axially, can be aligned between first and the second planetary gear set P1, P2, wherein the third clutch 28, viewed axially, can be aligned between the third and fourth planetary gear set P3, P4.

Furthermore, the second and first brakes 03, 04 and the second clutch 37, viewed axially, are preferably aligned side-by-side.

FIG. 2 shows an exemplary shift schematics of a multi-step transmission according to FIG. 1. Three shift elements are engaged for every gear. The shift schematics shows, as examples, the particular transmission ratios i of the individual gear steps, and, to be determined therefrom, the gear increments or step changes phi to the next higher gear, wherein the value 8.997 is the transmission ratio spread.

Typical values for stationary gear ratios of the planetary gear sets P1, P2, P3 and P4, which are engineered as minus planetary gear sets, are −1.60, −2.228, −1.60 and −3.642 respectively. FIG. 2 shows that, in case of sequential shifting, double shifts or group shifts are prevented, because two adjacent gear steps jointly use two shift elements. It is also shown that large transmission ratio spread is attained with small gear increments.

The first forward gear results from the engagement of the first and third brake 04, 05 and the second clutch 37; the second forward gear from the engagement of the third brake 05 and the first and second clutch 13, 37; the third forward gear from the engagement of the first and third brake 04, 05 and the first clutch 13; the fourth forward gear from the engagement of the third brake 05 and the first and third clutch 13, 28; the fifth forward gear from the engagement of the first brake 04 and first and third clutch 13, 28; the sixth forward gear, preferably designed as the direct gear, from the engagement of all the clutches 13, 37, 28; the seventh forward gear from the engagement of the first brake 04 and the second and third clutch 37, 28; the eighth forward gear from the engagement of the second brake 03 and second and third clutch 37, 28, and the ninth forward gear results from the engagement of the first and second brake 04, 03 and the third clutch 28; wherein the reverse gear results from the engagement of all the brakes 03, 04 and 05.

Since the brakes 04 and 05 are engaged in the first forward gear and in the first reverse gear, these shift elements can be used as start-up elements.

According to the invention, different gear increments can also result from the same gear schematics depending on the shift logic, thereby making it possible to realize an application-specific or vehicle-specific variation.

According to the invention, it is possible to provide additional freewheels at each suitable location of the multi-step transmission, for example, between a shaft and the housing, or possibly to connect two shafts.

According to the invention, an axle differential and/or a distributor differential can be disposed on the drive side or on the output side.

Within the scope of an advantageous development, the drive shaft 1 can be separated from a drive motor, as needed, by a clutch element, wherein a hydrodynamic converter, a hydraulic clutch, a dry start-up clutch, a wet start-up clutch, a magnetic powder clutch, or a centrifugal clutch, can be used as the clutch element. It is also possible to dispose such a start-up element in the power flow direction after the transmission wherein, in this case, the drive shaft 1 is continuously connected to the crankshaft of the engine.

The multi-step transmission, according to the invention, also makes it possible to situate a torsional-vibration damper between the engine and the transmission.

Within the scope of a further, not represented embodiment of the invention, a wear-free brake, for instance, a hydraulic or electric retarder or the like, can be disposed on each shaft, preferably on the drive shaft 1 or the output shaft 2, which is of special significance for use in commercial vehicles in particular. Furthermore, a power take-off drive can be provided on each shaft, preferably on the drive shaft 1 or the output shaft 2, for driving additional assemblies.

The friction shift elements that are used can be designed as power shiftable clutches or brakes. In particular, force-locking clutches or brakes can be used, for instance, lamellar clutches, band brakes, and/or cone clutches.

A further advantage of the multi-step transmission presented here is that an electric machine can be attached to each shaft as a generator and/or as an additional drive machine.

Obviously, any structural embodiment, in particular any spatial disposition of the planetary gear sets and the shift elements individually and relative to each other, and insofar as it is technically expedient, falls under the scope of protection of the present claims, without influencing the function of the transmission as specified in the claims, even if these embodiments are not explicitly represented in the figures or in the description.

REFERENCE CHARACTERS

| | |
|---|---|
| 1 | first shaft, drive shaft |
| 2 | second shaft, output shaft |
| 3 | third shaft |
| 4 | fourth shaft |
| 5 | fifth shaft |
| 6 | sixth shaft |
| 7 | seventh shaft |
| 8 | eighth shaft |
| 03 | second brake |
| 04 | first brake |
| 05 | third brake |
| 13 | first clutch |
| 28 | third clutch |
| 37 | second clutch |
| P1 | first planetary gear set |
| P2 | second planetary gear set |
| P3 | third planetary gear set |
| P4 | fourth planetary gear set |
| i | transmission ratio |
| phi | step change |
| G | housing |

The invention claimed is:

1. A multi-stage transmission of a planetary design for an automatic transmission for a motor vehicle comprising a drive shaft (1), an output shaft (2), and four planetary gear sets (P1, P2, P3, P4) being arranged in a housing (G), the multi-stage transmission having a total of eight rotatable shafts (1, 2, 3, 4, 5, 6, 7, 8) as well as at least six shift elements (03, 04, 05, 13, 28, 37) comprising first, second and third brakes (03, 04, 05) and first, second and third clutches (13, 28, 37) whose selective engagement produces different transmission ratios, between the drive shaft (1) and the output shaft (2), for implementing nine forward gears and one reverse gear, wherein the sun gear of the first planetary gear set (P1) is connected to the fourth shaft (4) which can be coupled to a transmission housing (G) by the first brake (04), the carrier of the first planetary gear set (P1) is connected to the third shaft (3) which can be coupled to a transmission housing (G) via the second brake (03), the carrier of the first planetary gear set (P1) is detachably connectable to the drive shaft (1) via the first clutch (13), and the carrier of the first planetary gear set (P1) is detachably connectable to the seventh shaft (7), via a second clutch (37);

the seventh shaft (7) is permanently connected to the ring gear of the second planetary gear set (P2) and is connected to the sun gear of the fourth planetary gear set (P4);

the drive shaft (1) is permanently connected to the sun gear of the second planetary gear set (P2) and to the carrier of the third planetary gear set (P3);

the sixth shaft (6) is permanently connected to the ring gear of the first planetary gear set (P1), the carrier of the second planetary gear set (P2) and the sun gear of the third planetary gear set (P3), the ring gear of the fourth planetary gear set (P4) is connected to the fifth shaft (5) which can be coupled to the transmission housing (G) via a third brake (05), and the output shaft (2) is detachably connectable to the eighth shaft (8), via a third clutch, which is connected to the ring gear of the third planetary gear set (P3), and the output shaft (2) is permanently connected to the carrier of the fourth planetary gear set (P4).

2. The multi-stage transmission according to claim 1, wherein the planetary gear sets (P1, P2, P3, P4) are minus planetary gear sets.

3. The multi-stage transmission according to claim 1, wherein a first forward gear results from engagement of the first and the third brakes (04, 05) and the second clutch (37);

a second forward gear results from engagement of the third brake (05) and the first and the second clutch (13, 37);

a third forward gear results from engagement of the first and the third brake (04, 05) and the first clutch (13);

a fourth forward gear results from engagement of the third brake (05) and the first and the third clutches (13, 28);

a fifth forward gear results from engagement of the first brake (04) and the first and the third clutches (13, 28);

a sixth forward gear results from engagement of the first, the second and the third clutches (13, 37, 28);

a seventh forward gear results from engagement of the first brake (04) and the second and the third clutches (37, 28);

an eighth forward gear results from engagement of the second brake (03) and the second and the third clutched (37, 28); and a ninth forward gear results results from engagement of the first and the second brakes (04, 03) and the third clutch (28); and the reverse gear results from engagement of the first, the second and the third brakes (03, 04 and 05).

* * * * *